United States Patent
Khalidov et al.

(10) Patent No.: US 12,259,332 B2
(45) Date of Patent: Mar. 25, 2025

(54) SYSTEMS, METHODS, AND APPARATUSES FOR DISTINGUISHING AN INTERFERING GAS IN A GAS FLOW

(71) Applicant: HONEYWELL INTERNATIONAL INC., Charlotte, NC (US)

(72) Inventors: Ruslan Khalidov, Lake Zurich, IL (US); Jeyong Jin, Lincolnshire, IL (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 254 days.

(21) Appl. No.: 17/937,618

(22) Filed: Oct. 3, 2022

(65) Prior Publication Data
US 2024/0118215 A1   Apr. 11, 2024

(51) Int. Cl.
*G01N 21/78* (2006.01)
*G01N 21/01* (2006.01)
*G01N 21/77* (2006.01)

(52) U.S. Cl.
CPC .......... *G01N 21/783* (2013.01); *G01N 21/01* (2013.01); *G01N 2021/7763* (2013.01); *G01N 2021/7773* (2013.01)

(58) Field of Classification Search
CPC ................. G01N 21/783; G01N 21/01; G01N 2021/7763; G01N 2021/7773; G01J 2003/467; G01J 3/462
USPC ........................................................ 356/402
See application file for complete search history.

(56) References Cited

U.S. PATENT DOCUMENTS

| | | | |
|---|---|---|---|
| 8,048,384 B1 | 11/2011 | Bokerman et al. | |
| 8,470,248 B2 | 6/2013 | Oda | |
| 10,962,515 B2 | 3/2021 | Jin et al. | |
| 2006/0008919 A1* | 1/2006 | Boay | G01N 21/783 |
| | | | 422/86 |

(Continued)

FOREIGN PATENT DOCUMENTS

| | | |
|---|---|---|
| CN | 108885177 B | 8/2021 |
| DE | 112011102881 B4 | 2/2020 |

(Continued)

OTHER PUBLICATIONS

Extended European Search Report Mailed on Feb. 22, 2024 for EP Application No. 23198194, 8 page(s).

(Continued)

*Primary Examiner* — Jonathan M Hansen
*Assistant Examiner* — Noah J. Haney
(74) *Attorney, Agent, or Firm* — ALSTON & BIRD LLP (57) ABSTRACT

Systems, methods, and apparatuses for distinguishing an interfering gas in a gas flow. An example system for distinguishing an interfering gas in a gas flow may include a treated tape configured to be in contact with the gas flow. The example system may further include a light source configured to emit at least three wavelengths of light from a light source. The example system may further include a photo diode configured to detect a reflected portion of each of the at least three wavelengths of light. The example system may further include a computing device. The computing device may be configured to analyze the reflected portion of each of the at least three wavelengths of light. The computing device may be further configured to distinguish the interfering gases in the gas flow using a 2-dimensional color space model.

18 Claims, 4 Drawing Sheets

(56) References Cited

U.S. PATENT DOCUMENTS

| | | | | |
|---|---|---|---|---|
| 2007/0243107 A1* | 10/2007 | Chase | ............... | G01N 21/783 422/91 |
| 2008/0205754 A1* | 8/2008 | Ogasawara | ............... | G01J 3/50 382/165 |
| 2013/0259749 A1* | 10/2013 | Moretti | ............... | A61B 5/742 436/133 |
| 2016/0327533 A1* | 11/2016 | Jin | ............... | G01N 21/78 |
| 2017/0089832 A1* | 3/2017 | Uemura | ............... | G01N 21/783 |
| 2018/0063975 A1* | 3/2018 | Ely | ............... | C09C 1/0009 |
| 2019/0041338 A1* | 2/2019 | Tobias | ............... | G01N 21/783 |
| 2019/0041339 A1* | 2/2019 | Tobias | ............... | G01N 21/8483 |
| 2019/0049366 A1* | 2/2019 | O'Donnell | ............... | G01J 3/10 |
| 2019/0137405 A1* | 5/2019 | Colomb | ............... | G01N 31/224 |
| 2020/0124539 A1 | 4/2020 | Tobias et al. | | |

FOREIGN PATENT DOCUMENTS

| | | | | |
|---|---|---|---|---|
| WO | WO-2012149203 A1 * | 11/2012 | ............... | A61B 5/0075 |
| WO | 2013/138329 A1 | 9/2013 | | |
| WO | 2017/178774 A1 | 10/2017 | | |

OTHER PUBLICATIONS

Laura Engel et al., "Printed sensor labels for colorimetric detection of ammonia, formaldehyde and hydrogen sulfide from the ambient air," Sensors and Actuators: B. Chemical, 330:1-12, (2021).

Luis Fermin Capitan-Vallvey et al., "Recent developments in computer vision-based analytical chemistry: A tutorial review," Analytica Chimica Acta, 899:23-56, (2015).

\* cited by examiner

SYSTEMS, METHODS, AND APPARATUSES FOR DISTINGUISHING AN INTERFERING GAS IN A GAS FLOW

TECHNOLOGICAL FIELD

Embodiments of the present disclosure relate generally to distinguishing an interfering gas in a gas flow.

BACKGROUND

Applicant has identified many technical challenges and difficulties associated with distinguishing an interfering gas in a gas flow. Through applied effort, ingenuity, and innovation, Applicant has solved problems related to distinguishing an interfering gas in a gas flow by developing solutions embodied in the present disclosure, which are described in detail below.

BRIEF SUMMARY

Various embodiments described herein relate to systems, apparatuses, and methods for distinguishing an interfering gas in a gas flow.

In accordance with one aspect of the disclosure, a method for distinguishing an interfering gas in a gas flow is provided. In some embodiments, the method includes causing at least three wavelengths of light to be emitted from a light source. In some embodiments, the method further includes detecting a reflected portion of each of the at least three wavelengths of light. In this regard, the reflected portion of each of the at least three wavelengths of light is reflected from a treated tape that is in contact with the gas flow. In some embodiments, the method includes distinguishing the interfering gas in the gas flow using a 2-dimensional color space model.

In accordance with another aspect of the disclosure, a system for distinguishing an interfering gas in a gas flow is provided. In some embodiments, the system includes a treated tape configured to be in contact with the gas flow. In some embodiments, the system includes a light source configured to emit at least three wavelengths of light from a light source. In some embodiments, the system includes a photo diode configured to detect a reflected portion of each of the at least three wavelengths of light. In this regard, the reflected portion of each of the at least three wavelengths of light is reflected from the treated tape. In some embodiments, the system further includes a computing device comprising at least one processor and at least one non-transitory memory comprising program code, wherein the at least one non-transitory memory and the program code are configured to, with the at least one processor, cause the computing device to analyze the reflected portion of each of the at least three wavelengths of light. In some embodiments, the computing device is further caused to distinguish the interfering gas in the gas flow using a 2-dimensional color space model.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Embodiments disclosed herein address technical problems associated with distinguishing an interfering gas in a gas flow. As would be understood by one skilled in the field to which this disclosure pertains, there are numerous example scenarios in which a user may need to distinguish an interfering gas in a gas flow.

In many example industrial processes (e.g., semiconductor fabrication), various gases are used to affect the process. In order to ensure these processes are efficient, safe, and correctly done, it is critical, in some examples, that unwanted interfering gases that may become present in the industrial process are distinguished and identified, because these unwanted interfering gases can harm individuals, damage the process result, and trigger false alarms. Accordingly, in some examples, robust systems and methods are needed to monitor the flow of gases used in these processes to ensure that the introduction of an interfering gas (e.g., a gas that is not wanted) into the process can be quickly detected and remedied.

Many example solutions exist for detecting the introduction of an interfering gas into a flow of gas used in a process. For example, many gas detection systems place a chemically treated material in contact with the gas flow that is designed to react in the presence of an interfering gas (e.g., the chemically treated material may change color in the presence of an interfering gas). The chemically treated material may be regularly inspected, for example by shining a light on it, to determine if an interfering gas is present in the gas flow. In some example solutions, a reflected portion of the light shined on the chemically treated material may be detected and analyzed using a 3-dimensional color space model to distinguish the particular interfering gas in the gas flow. Based on the inspection and/or analysis using the 3-dimensional color space model, appropriate steps may be taken, in some examples, to address the introduction of the interfering gas.

Although many solutions exist for identifying the introduction of an interfering gas into a gas flow used in a process, these solutions are generally unable to distinguish the particular interfering gas that has been introduced into the gas flow in a reliable and efficient manner. For example, even though the presence of an interfering gas may be known using these solutions, it may be difficult to track down and remedy the cause of the interfering gas, because different interfering gases could have been introduced into the gas flow for numerous reasons. As another example, other gases, such as target gases (e.g., gases that may be used to affect the process and/or other gases that are not classified as interfering gases or gases used to affect the process), may also cause the chemically treated material to react. However, some interfering gases may cause the chemically treated material to react when there is a relatively safe level of the interfering gas in the gas flow while other interfering gases and/or target gases, for example, may cause the chemically treated tape to react only when there is a dangerous level of the other interfering gas and/or target gas in the gas flow. Thus, being unable to distinguish the interfering gas from other interfering gases and/or target gases may result in costly false alarms that shut down the industrial process, because operators may be unable to determine if it is truly necessary to shut down the process (e.g., because it would be unsafe to not shut down the process). As another example, using a 3-dimensional color space model to distinguish an interfering gas is often technically challenging and costly, because it requires the analysis of three separate dynamically changing color components and the accuracy of the 3-dimensional color space model is dependent upon the concentration of the interfering gas in the gas flow. As a result, the inability to distinguish the particular interfering gas that has been introduced into the gas flow in a reliable and efficient manner causes, in some examples, costly delays, potential harm to individuals, and potential spoilage of the materials used in the process or created through the process.

Thus, to address these and/or other issues related to distinguishing an interfering gas in a gas flow; example systems, apparatuses, and/or methods for distinguishing an interfering gas using a 2-dimensional color space model is disclosed herein. For example, embodiments in this disclosure, described in greater detail below, include a system in which a photo diode detects three different wavelengths of light reflected from a stain that has developed on a treated tape in contact with a gas flow. Based on the wavelengths of light detected by the photo diode, a computing device determines the location of an interfering gas within a 2-dimensional color space model. The location of the interfering gas within the 2-dimensional color space model may then be analyzed in relation to known locations of known interfering gases within the 2-dimensional color space model to distinguish the particular the interfering gas that is present in the gas flow, which may be done without being required to analyze three separate dynamically changing color components or concern for the concentration of the interfering gas in the gas flow. Accordingly, example embodiments disclosed herein enable the immediate detection of a particular interfering gas in a gas flow, enabling appropriate steps to be taken to remedy the fault that has caused the introduction of the interfering gas (e.g., the introduction of a particular interfering gas may indicate that a particular machine involved in the process is malfunctioning or whether it is safe to continue with the process).

Example System for Distinguishing an Interfering Gas in a Gas Flow

Figure 1:
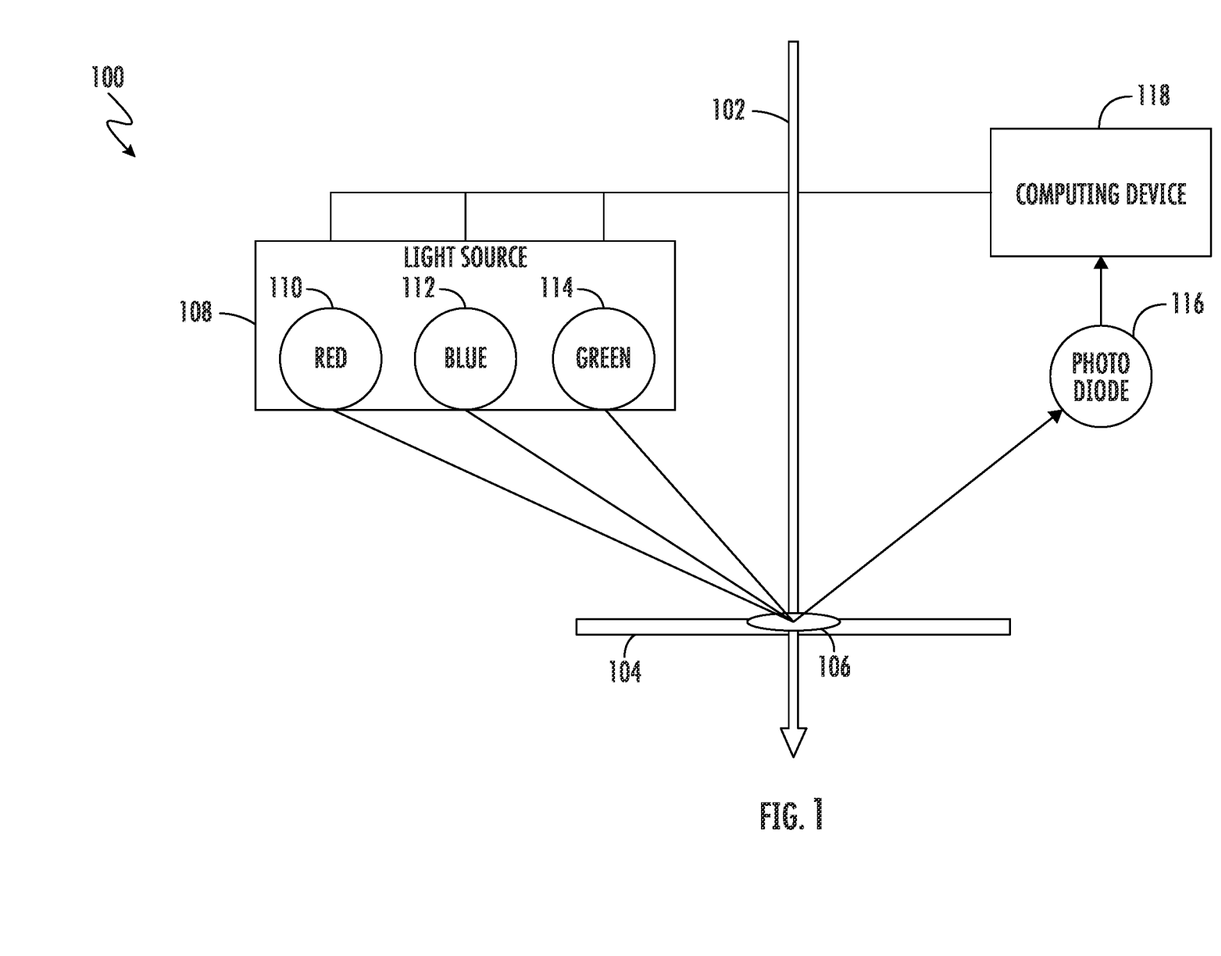
FIG. 1 illustrates an example system for distinguishing an interfering gas in a gas flow in accordance with one or more embodiments of the present disclosure.

Embodiments herein provide for an example system 100 for distinguishing an interfering gas in a gas flow. In some embodiments, as shown in FIG. 1, the interfering gas and/or one or more gases may be configured to flow through a gas flow 102. For example, the gas flow 102 may be enclosed space (e.g., a pipe) in which gas flows for use in a process (e.g., semiconductor fabrication). In some embodiments, the one or more gases may be any type of gas used for a particular process. For example, in some embodiments the interfering gas may be arsine ($AsH_3$), phosphine ($PH_3$), hydrogen sulfide ($H_2S$), germane ($GeH_4$), diborane ($B_2H_6$), and/or silane ($SiH_4$). In some embodiments, the target gas may be arsine ($AsH_3$).

In some embodiments, the system 100 may include a treated tape 104 configured to be in contact with the gas flow 102. In some embodiments, the treated tape 104 may be treated with one or more chemicals. In some embodiments, the one or more chemicals may at least partially facilitate distinguishing the interfering gas. In some embodiments, the one or more chemicals used to treat the treated tape 104 may be different depending on which interfering gas the system 100 is distinguishing. In some embodiments, the treated tape 104 may be white. In some embodiments, the treated tape 104 may be one or more different colors.

In some embodiments, if an interfering gas is present in the gas flow a stain 106 may develop on the treated tape 104. In some embodiments, a color of the stain 106 may be different based on which particular interfering gas is present in the gas flow 102. In some embodiments, the treated tape 104 may be placed in contact with the gas flow 102 such that the stain 106 only develops on a portion of the treated tape 104. Accordingly, in such embodiments, after the stain 106 has developed on the treated tape 104 such that the interfering gas may be distinguished in the gas flow, the treated tape 104 may be adjusted such that a different portion of the treated tape 104 is in contact with the gas flow 102 enabling the treated tape 104 to be used multiple times for distinguishing an interfering gas in the gas flow.

In some embodiments, the system 100 may include a light source 108. In some embodiments, the light source 108 may be configured to emit wavelengths of light onto the treated tape 104 and/or the stain 106. In some embodiments, the light source 108 may be configured to emit one or more combinations of different wavelengths of light. For example, the light source 108 may be configured to emit white light. In some embodiments, the light source 108 may be configured to emit individual wavelengths of light. For example, the light source 108 may be configured to emit specific wavelengths of visible light such as red wavelength light, blue wavelength light, and/or green wavelength light (e.g., the primary colors). In some embodiments, the light source 108 may be configured to emit wavelengths of light in separate pulses. Additionally or alternatively, the light source 108 may be configured to continuously emit wavelengths of light. In some embodiments, the light source 108 may be a single light configured to emit different wavelengths of light. Additionally or alternatively, the light source 108 may include a plurality of lights each configured to emit a particular wavelength of light. For example, as depicted in FIG. 1, the light source 108 may include a red light 110 configured to emit red wavelength light, a blue light 112 configured to emit blue wavelength light, and/or a green light 114 configured to emit green wavelength light. In some embodiments, the light source 108 and/or each of the red light 110, blue light 112, and green light 114 may be a light emitting diode (LED). Although depicted as a separate component of the system 100 in FIG. 1, in some embodiments, the light source 108 may be a component of the computing device 118.

In some embodiments, the system 100 may include a photo diode 116 configured to detect a reflected portion of the wavelengths of light reflected from the treated tape 104 and/or the stain 106. In some embodiments, the photo diode 116 may be configured to detect the presence of any light reflected from the treated tape 104 and/or the stain 106. Additionally or alternatively, the photo diode 116 may be configured to detect specific wavelengths of light. For example, if the red light 110 emits red wavelength light, the photo diode 116 may be configured to detect the presence of red wavelength light reflected from the treated tape 104 and/or the stain 106.

Although in the system 100 depicted in FIG. 1 the photo diode 116 is configured to detect the reflected portion of the wavelengths of light reflected from the treated tape 104 and/or the stain 106, it would be understood by one skilled in the field to which this disclosure pertains, that there are numerous other example devices that may be used to detect the reflected portion of the wavelengths of light reflected from the treated tape 104 and/or stain 106. For example, a camera may be used to detect the reflected portion of the wavelengths of light reflected from the treated tape 104 and/or stain 106.

The system 100 may include a computing device 118. In some embodiments, computing device 118 may be configured to analyze the reflected portion of the wavelengths of light reflected from the treated tape 104 and/or the stain 106 that were detected by the photo diode 116. In some embodiments, the reflected portion of the wavelengths of light reflected from the treated tape 104 and/or the stain 106 may be converted into a digital signal by the photo diode 116 (e.g., using an analog to digital converter (ADC) associated with the photo diode 116) and transmitted to the computing device 118 for analysis (e.g., the computing device 118 performs analysis on the reflected portion of the wavelengths of light reflected from the treated tape 104 and/or the stain 106 that has been converted into a digital signal by the photo diode 116). In some embodiments, the reflected portion of the wavelengths of light reflected from the treated tape 104 and/or the stain 106 may be transmitted to the computing device 118 and the computing device 118 (e.g., using an ADC associated with the computing device 118) may convert the reflected portion of the wavelengths of light into a digital signal for analysis (e.g., the computing device 118 performs analysis on the reflected portion of the wavelengths of light reflected from the treated tape 104 and/or the stain 106 that has been converted into a digital signal by the computing device 118). In some embodiments, based on the analysis of the reflected portion of the wavelengths of light, the computing device 118 of the system 100 may be able to distinguish the interfering gas in the gas flow using a 2-dimensional color space model.

In some embodiments, the computing device 118 may determine a count each time the photo diode 116 detects the reflected portion of the wavelengths of light reflected from the treated tape 104 and/or the stain 106. In some embodiments, the computing device 118 may determine a count for each wavelength of light emitted from the light source 108. For example, if the red light 110, the blue light 112, and the green light 114 each emit individual pulses of red wavelength light, green wavelength light, and blue wavelength light, respectively, the computing device 118 may determine a count for the red light 110, the blue light 112, and the green light 114. Said differently, in such an example, the computing device 118 may determine a red wavelength count for the red wavelength light emitted from the red light 110, a blue wavelength count for the blue wavelength light emitted from the blue light 112, and a green wavelength count for green wavelength light emitted from the green light 114.

In some embodiments, the counts that the computing device 118 determines for specific wavelengths of light emitted by the light source 108 may be dependent on the color of the stain 106 and/or the treated tape 104. For example, in some embodiments, if no stain has developed on the treated tape 104 (e.g., the treated tape 104 is white), the count determined by the computing device 118 may be different than the count determined by the computing device 118 if a stain 106 has developed on the treated tape 104. In this regard, for example, if no stain has developed on the treated tape 104 (e.g., the treated tape 104 is white) the computing device 118 may determine a count of approximately 3200, if a dark stain has developed on the treated tape 104 (e.g., an approximately black stain has developed on the treated tape 104) the computing device 118 may determine a count that is near zero, and if a light stain has developed on the treated tape 104 (e.g., a stain has developed on the treated tape such that the treated tape 104 is not white and the stain is not approximately black), the computing device 118 may determine a count between 0 and 3200. Accordingly, since the color of the stain 106 is dependent on the particular interfering gas present in the gas flow 102, as described above, the system 100 may be able to distinguish an interfering gas in the gas flow based, in part, on the counts determined by the computing device 118.

In some embodiments, using the counts determined by the computing device 118, the computing device 118 may calculate an adjusted count (AC) for some or all of the wavelengths of light emitted by the light source 108 (e.g., the reflected portion of which was detected by the photo diode 116). For example, the computing device 118 may calculate a red wavelength AC for the red wavelength light that has been emitted from the red light 110, a blue wavelength AC for the blue wavelength light emitted from the blue light 112, and a green wavelength AC for the green wavelength light emitted from the green light 114. In some embodiments, the AC for each different wavelength of light may be calculated based on equation (1):

$$AC = C\frac{N(0) - N(1)}{N(1)}, \quad (1)$$

where N(0) represents a count for a wavelength of light (e.g., a count for a red wavelength of light) at time zero, N(1) represents a count for a wavelength of light at time t, and C is a constant. In some embodiments, C may be equal to 3200. In some embodiments, time zero may be when no gas is flowing through the gas flow 102. Accordingly, in some embodiments, time zero may be when the treated tape 104 is initially placed in contact with the gas flow 102.

In some embodiments, the analysis performed by the computing device 118 may further include calculating a ratio between the adjusted counts of various wavelengths of light emitted by the light source 108. For example, in some embodiments, the computing device 118 may calculate a ratio of a blue wavelength AC to a green wavelength AC (B2G) by dividing the blue wavelength AC by the green wavelength AC. As another example, the computing device 118 may calculate a ratio of a red wavelength AC to a green wavelength AC (R2G) by dividing the red wavelength AC by the green wavelength AC. Although discussed above with respect to B2G and R2G, the computing device 118 may be capable of calculating a ratio between ACs associated with any wavelength of light (e.g., other wavelengths of visible light other than red wavelengths, green wavelengths, and/or blue wavelengths).

Figure 2:
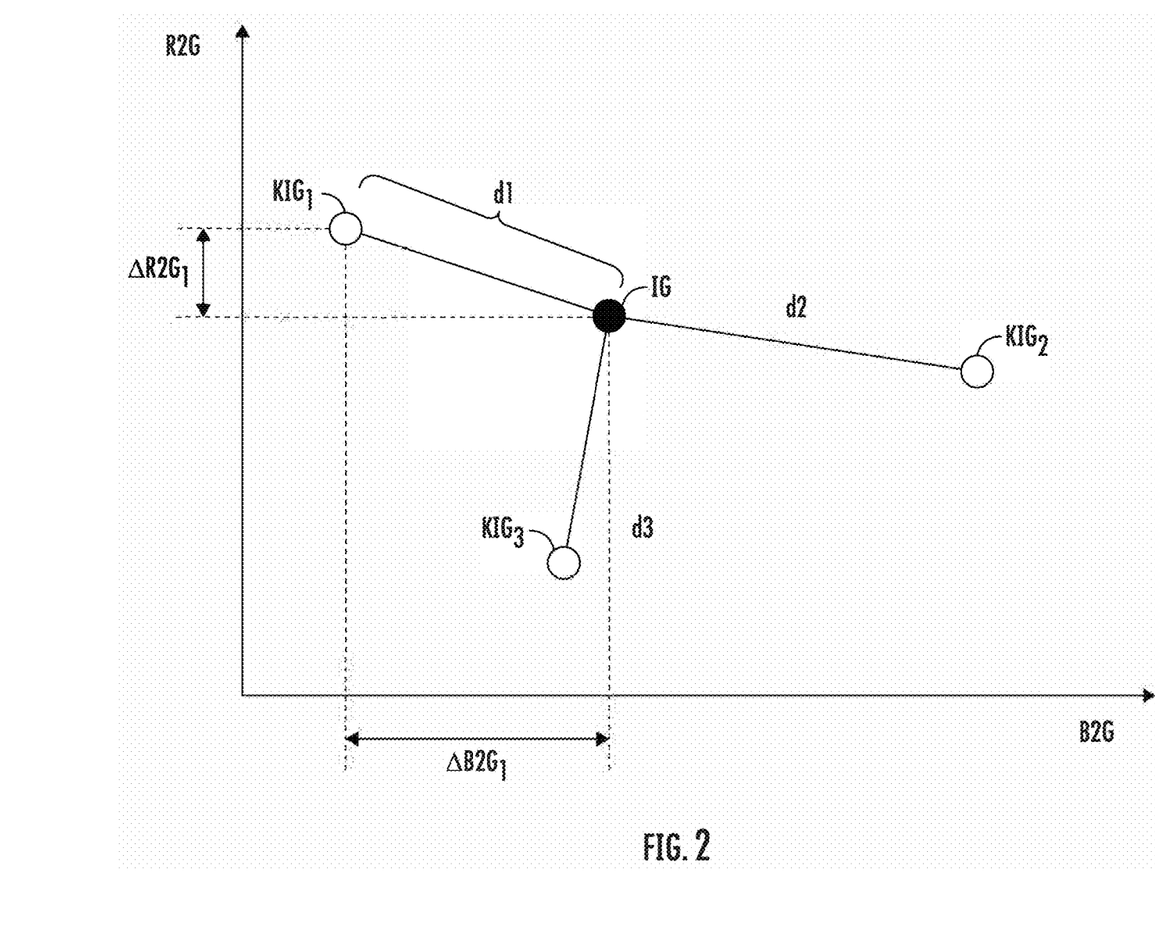
FIG. 2 illustrates an example 2-dimensional color space model in accordance with one or more embodiments of the present disclosure.

In some embodiments, using the determined ratios of AC for certain wavelengths of light emitted by the light source 108, the computing device 118 may determine the location of the interfering gas in a color space model. For example, as depicted in FIG. 2, in embodiments in which the photo diode 116 detected a reflected portion of wavelengths of light emitted from the red light 110, the blue light 112, and/or the green light 114, the computing device 118 may determine the location of the interfering gas in a 2-dimensional color space model based on the B2G and R2G calculated by the computing device 118. In the example 2-dimensional color space model depicted in FIG. 2, one axis is represented by B2G, and the other axis is represented by R2G and the location (depicted as IG in FIG. 2) of the interfering gas is plotted in the 2-dimensional color space model. In some embodiments, the known locations of a plurality of known interfering gases may also be plotted in the 2-dimensional color space model. For example, in the example 2-dimensional color space model of FIG. 2 the known locations (depicted as $KIG_1$, $KIG_2$, $KIG_3$ in FIG. 2) for three known interfering gases (e.g., arsine ($AsH_3$), phosphine ($PH_3$), and/or hydrogen sulfide ($H_2S$)) are plotted. In some embodiments, the known locations of the plurality of known interfering gases may be determined by experimental testing and/or by theoretical analysis (e.g., by analysis of chemical formulas).

In some embodiments, after determining the location of the interfering gas the computing device 118 may identify the interfering gas as being one of the known interfering gases (e.g., arsine ($AsH_3$), phosphine ($PH_3$), and/or hydrogen sulfide ($H_2S$)) using the 2-dimensional color space model. In this regard, the computing device 118 may calculate a distance ($d_i$) from the location (IG) of the interfering gas within the 2-dimensional color space model to a known location of each of a plurality of known interfering gases within the 2-dimensional color space model. In some embodiments, this may be done using equation (2):

$$d_i = \sqrt{\Delta B2G_i^2 + \Delta R2G_i^2}, \quad (2)$$

where $\Delta B2G_i$ represents the difference between the ratio of the blue wavelength AC to the green wavelength AC of the interfering gas and the ratio of the blue wavelength AC to the green wavelength AC of one of the known interfering gases and $\Delta R2G_i$ represents the difference between the ratio of the red wavelength AC to the green wavelength AC of the interfering gas and the ratio of the red wavelength AC to the green wavelength AC of one of the known interfering gases. For example, in the example 2-dimensional color space model of FIG. 2 in which there are three known locations ($KIG_1$, $KIG_2$, $KIG_3$) of three known interfering gases, the computing device 118 may calculate $d_1$ (the distance from the location (IG) of the interfering gas to the first known location ($KIG_1$) of the first known interfering gas), $d_2$ (the distance from the location (IG) of the interfering gas to the second known location ($KIG_2$) of the second known interfering gas), and $d_3$ (the distance from the location (IG) of the interfering gas to the third known location ($KIG_3$) of the third known interfering gas).

In some embodiments, the computing device 118 may identify the interfering gas as being a first known interfering gas based on the distance between the location of the interfering gas in the 2-dimensional color space model and the known location of one of the known interfering gases in the 2-dimensional color space model (e.g., $d_1$, $d_2$, and $d_3$). In this regard, the computing device 118 may identify the interfering gas as the known interfering gas whose location within the 2-dimensional color space model is closest (e.g., the smallest distance $d_i$) to the location of the interfering gas within the 2-dimensional color space model. For example, in the example 2-dimesional color space model depicted in FIG. 2, the location ($KIG_1$) of the first known interfering gas is closest to the location (IG) of the interfering gas (e.g., $d_1$ is smaller than $d_2$ and $d_3$). Accordingly, the computing device 118 may identify the interfering gas as being the first known interfering gas.

In some embodiments, the computing device 118, may calculate a probability $p_i$ that the interfering gas is one of the known interfering gas. Said differently, the computing device 118 may determine a probability to indicate a confidence that the interfering gas has been correctly identified as a particular one of the known interfering gases and/or the likelihood that the interfering gas is actually a different one of the known interfering gases. To calculate the probability $p_i$, the computing device 118 may first calculate a total distance (D) using equation (3):

$$D = \Sigma_i^n d_i, \quad (3)$$

where D is equal to the summation of the distances between the location of the interfering gas and the known location of each of the plurality of known interfering gases within the 2-dimensional color space model. For example, in the example 2-dimensional color space model depicted in FIG. 2 in which there are three known locations ($KIG_1$, $KIG_2$, $KIG_3$) of known interfering gases, the total distance D would be the summation of $d_i$, $d_2$, and $d_3$.

The computing device 118 may then calculate a reverse distance ($r_i$) for the known location of each of the plurality of known interfering gases using equation (4):

$$r_i = \frac{D}{d_i}, \quad (4)$$

where D is the total distance and $d_i$ is the distance from the location of the interfering gas to the known location of each of the plurality of known interfering gases within the 2-dimensional color space model. For example, in the 2-dimensional color space model depicted in FIG. 2 in which there are three known locations ($KIG_1$, $KIG_2$, $KIG_3$) of known interfering gases, the computing device may calculate $r_i$, $r_2$, and $r_3$.

The computing device 118 may then calculate a total reversed distance (R) using equation (5):

$$R = \Sigma_i^n r_i, \quad (5)$$

where R is equal to the summation of the reverse distances for the known location of each of the plurality of known interfering gases. For example, in the 2-dimensional color space model depicted in FIG. 2 in which there are three known locations ($KIG_1$, $KIG_2$, $KIG_3$) of known interfering gases, the reverse distance R would be the summation of $r_1$, $r_2$, and $r_3$.

In some embodiments, the probability that the interfering gas is one of the known interfering gases may be calculated using equation (6):

$$p_i = \frac{r_i}{D}. \quad (6)$$

where $p_i$ is the probability that the interfering gas is one of the known interfering gas, $r_i$ is the reverse distance, and D is the total distance. For example, in the example 2-dimensional color space model depicted in FIG. 2 in which there are three known locations ($KIG_1$, $KIG_2$, $KIG_3$) of known interfering gases, $p_1$ is the probability that the interfering gas is the first known interfering gas, $p_2$ is the probability that the interfering gas is the second known interfering gas, and $p_3$ is the probability that the interfering gas is the third known interfering gas.

In some embodiments, the system 100 may be configured to determine if the treated tape 104 is approximately white. In some embodiments, the system 100 may determine the color of the treated tape 104 when no gas is flowing through the gas flow 102 (e.g., at time zero). For example, the system 100 may determine the color of the treated tape 104 when the treated tape 104 is initially placed in contact with the gas flow 102 and/or after the treated tape 104 is adjusted such that a different portion of the treated tape 104 is in contact with the gas flow 102 (e.g., after a stain 106 has developed on a portion of the treated tape 104). In this regard, as described above, the light source 108 may be configured to emit wavelengths of light onto the treated tape 104. In some embodiments, the computing device 118 may determine a count of the reflected portion of the wavelengths of light reflected from the treated tape 104 detected by the photo diode 116. In this regard, in some embodiments, the computing device 118 may determine that the treated tape 104 is approximately white if the computing device 118 determines a count of approximately 3200. In some embodiments, if system 100 determines that the treated tape 104 is not approximately white (e.g., the computing device 118 did not determine a count of approximately 3200), the computing device 118 may be configured to determine an offset associated with the treated tape 104. For example, if the computing device 118 determines a count of 3000 when determining if the treated tape 104 is approximately white, the computing device 118 may determine an offset of 200. In some embodiments, if the system 100 determines that the treated tape 104 is not approximately white, the computing device 118 may be configured to offset future counts determined by the computing device 118 (e.g., counts determined after time zero) by the offset. Accordingly, the system 100 may be able to ensure that an interfering gas is accurately distinguished even in embodiments in which the treated tape 104 is not approximately white.

Example Method for Distinguishing an Interfering Gas in a Gas Flow

Figure 3:
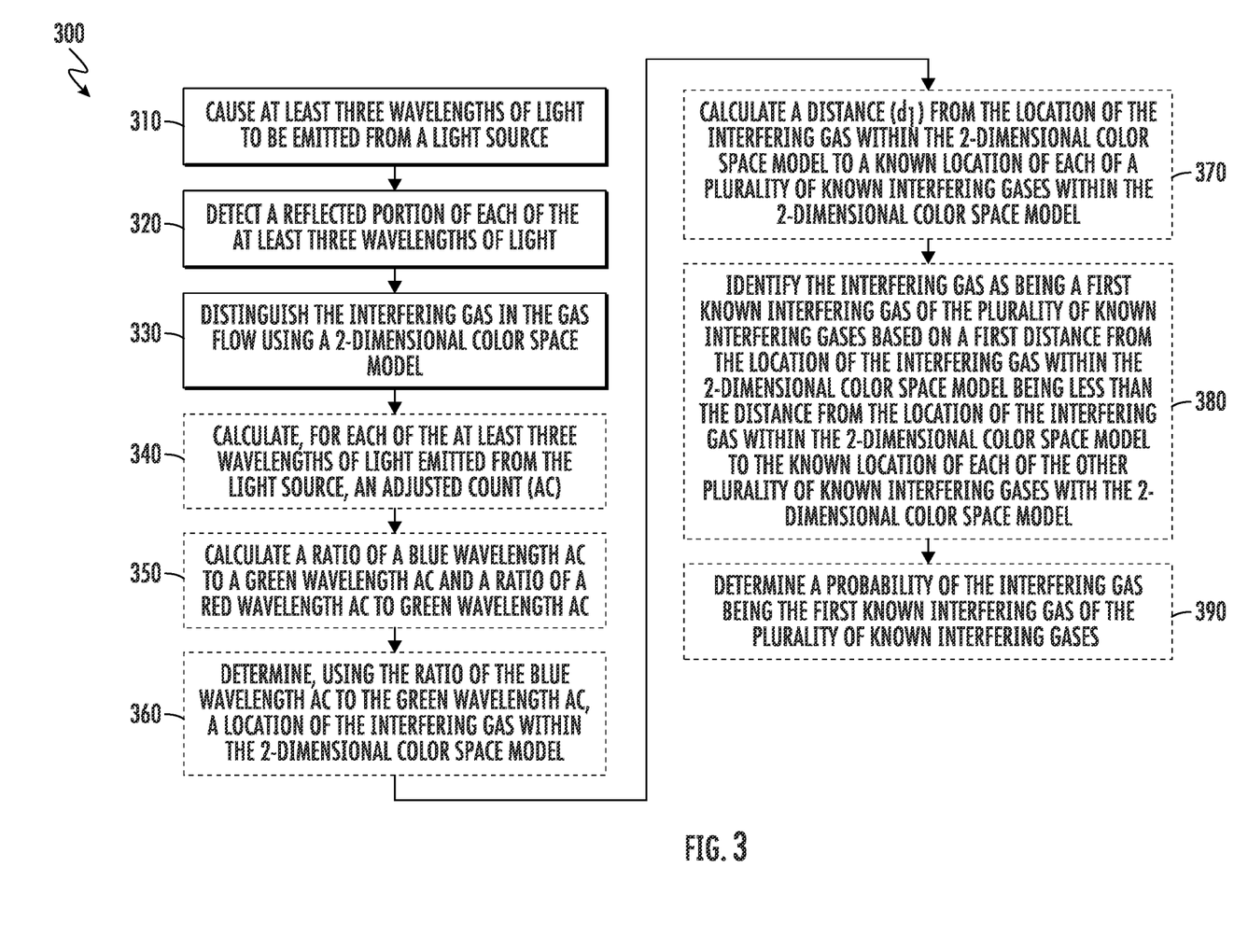
FIG. 3 illustrates a flowchart of an example method for distinguishing an interfering gas in a gas flow in accordance with one or more embodiments of the present disclosure.

Referring now to FIG. 3, a flowchart providing an example method 300 for distinguishing an interfering gas in a gas flow is illustrated. In this regard, FIG. 3 illustrates operations that may be performed by the system 100 and/or components of the system 100. For example, in some embodiments, the operations illustrated in FIG. 3 may, for example, be performed by, with the assistance of, and/or under the control of the computing device 118 (e.g., processing circuitry 402, memory 404, processor 406, controller 408, and/or communication interface 410), the light source 108, and/or the photo diode 116, as described above.

As shown in block 310, the method may include causing at least three wavelengths of light to be emitted from a light source. As described above, the light source may be configured to emit a combination of different wavelengths of light and/or individual wavelengths of light in separate pulses and/or continuously. Additionally, as described above, the light source may be a single light or may include a plurality of lights that, in some embodiments, are each configured to emit different wavelengths of light.

As shown in block 320, the method may include detecting a reflected portion of each of the at least three wavelengths of light. As described above, a photo diode may be configured to detect the reflected portion of the wavelengths of light reflected from the treated tape and/or the stain. For example, the photo diode may detect specific wavelengths of light (e.g., red wavelength light) reflected from the treated tape and/or stain. As described above, although a photo diode may be configured to detect the reflected portion of the wavelengths of light reflected from the treated tape and/or the stain, it would be understood by one skilled in the field to which this disclosure pertains, that there are numerous other example devices that may be used to detect the reflected portion of the wavelengths of light reflected from the treated tape and/or stain. For example, a camera may be used to detect the reflected portion of the wavelengths of light reflected from the treated tape and/or stain.

As shown in block 330, the method may include distinguishing the interfering gas in the gas flow using a 2-dimesional color space model. For example, the interfering gas may be one of arsine ($AsH_3$), phosphine ($PH_3$), and/or hydrogen sulfide ($H_2S$). As described above, in some embodiments, the computing device may be configured to distinguish the interfering gas in the gas flow based on the analysis of the reflected portion of the wavelengths of light reflected from the treated tape and/or stain that were detected by the photo diode.

As shown in optional block 340, the method may include calculating, for each of the at least three wavelengths of light emitted from the light source, an adjusted count (AC). In this regard, as described above, the computing device may determine a count each time the photo diode detects the reflected portion of the wavelengths of light reflected from the treated tape and/or the stain. In some embodiments, as described above, the computing device may determine a count for each wavelength of light emitted by the light source. In some embodiments, using the counts determined by the computing device, the computing device may calculate an adjusted count (AC) for some or all of the wavelengths of light emitted by the light source. In some embodiments, the AC for each different wavelength of light may be calculated based on equation (1):

$$AC = C\frac{N(0) - N(1)}{N(1)}, \quad (1)$$

where N(0) represents a count for a wavelength of light (e.g., a count for a red wavelength of light) at time zero, N(1) represents a count for a wavelength of light at time t, and C is a constant. In some embodiments, C may be equal to 3200. As an example, the computing device may calculate a red wavelength AC for red wavelength light that has been emitted from a red light, a blue wavelength AC for blue wavelength light that has been emitted from a blue light, and a green wavelength AC for green wavelength light that has been emitted from a green light.

As shown in optional block 350, the method may include calculating a ratio of a blue wavelength AC to a green wavelength AC and a ratio of a red wavelength AC to the green wavelength AC. As described above, the computing device may calculate a ratio of a blue wavelength AC to a green wavelength AC (B2G) by dividing the blue wavelength AC by the green wavelength AC and the computing device may calculate a ratio of a red wavelength AC to a green wavelength AC (R2G) by dividing the red wavelength AC by the green wavelength AC.

As shown in optional block 360, the method may include determining, using the ratio of the blue wavelength AC to the green wavelength AC and the ratio of the red wavelength AC to the green wavelength AC, a location of the interfering gas within the 2-dimensional color space model. For example in embodiments in which the photo diode detected a reflected portion of wavelengths of light emitted from the red light, the blue light, and/or the green light, the computing device may determine the location of the interfering gas in a 2-dimensional color space model based on the B2G and R2G calculated by the computing device. In this regard, in the 2-dimensional color space model one axis may be represented by B2G and the other axis may be represented by R2G.

As shown in optional block 370, the method may include calculating a distance ($d_i$) from the location of the interfering gas within the 2-dimensional color space model to a known location of each of a plurality of known interfering gases within the 2-dimensional color space model. As described above, in some embodiments, the computing device may calculate the distance ($d_i$) using equation (2):

$$d_i = \sqrt{\Delta B2G_i^2 + \Delta R2G_i^2}, \quad (2)$$

where $\Delta B2G_i$ represents the difference between the ratio of the blue wavelength AC to the green wavelength AC of the interfering gas and the ratio of the blue wavelength AC to the green wavelength AC of one of the known interfering gases and $\Delta R2G_i$ represents the difference between the ratio of the red wavelength AC to the green wavelength AC of the interfering gas and the ratio of the red wavelength AC to the green wavelength AC of one of the known interfering gases.

As shown in optional block 380, the method may include identifying the interfering gas as being a first known interfering gas of the plurality of known interfering gases based on a first distance from the location of the interfering gas within the 2-dimensional color space model being less than the distance from the location of the interfering gas within the 2-dimensional color space model to the known location of each of the other plurality of known interfering gases within the 2-dimensional color space model As shown in optional block 390, the method may include determining a probability of the interfering gas being the first known interfering gas of the plurality of known interfering gases. As described above, to calculate the probability $p_i$, the computing device may first calculate a total distance (D) using equation (3):

$$D = \Sigma_i^n d_i, \quad (3)$$

where D is equal to the summation of the distances between the location of the interfering gas and the known location of each of the plurality of known interfering gases within the 2-dimensional color space model. The computing device may then calculate a reverse distance ($r_i$) for the known location of each of the plurality of known interfering gases using equation (4):

$$r_i = \frac{D}{d_i}, \quad (4)$$

where D is the total distance and $d_i$ is the distance from the location of the interfering gas to the known location of each of the plurality of known interfering gases within the 2-dimensional color space model. The computing device may then calculate a total reversed distance (R) using equation (5):

$$R = \Sigma_i^n r_i, \quad (5)$$

where R is equal to the summation of the reverse distances for the known location of each of the plurality of known interfering gases. In some embodiments, the computing device may then calculate the probability that the interfering gas is one of the known interfering gases using equation (6):

$$p_i = \frac{r_i}{D}. \quad (6)$$

where $p_i$ is the probability that the interfering gas is one of the known interfering gas, $r_i$ is the reverse distance, and D is the total distance.

Example Computing Device

Figure 4:
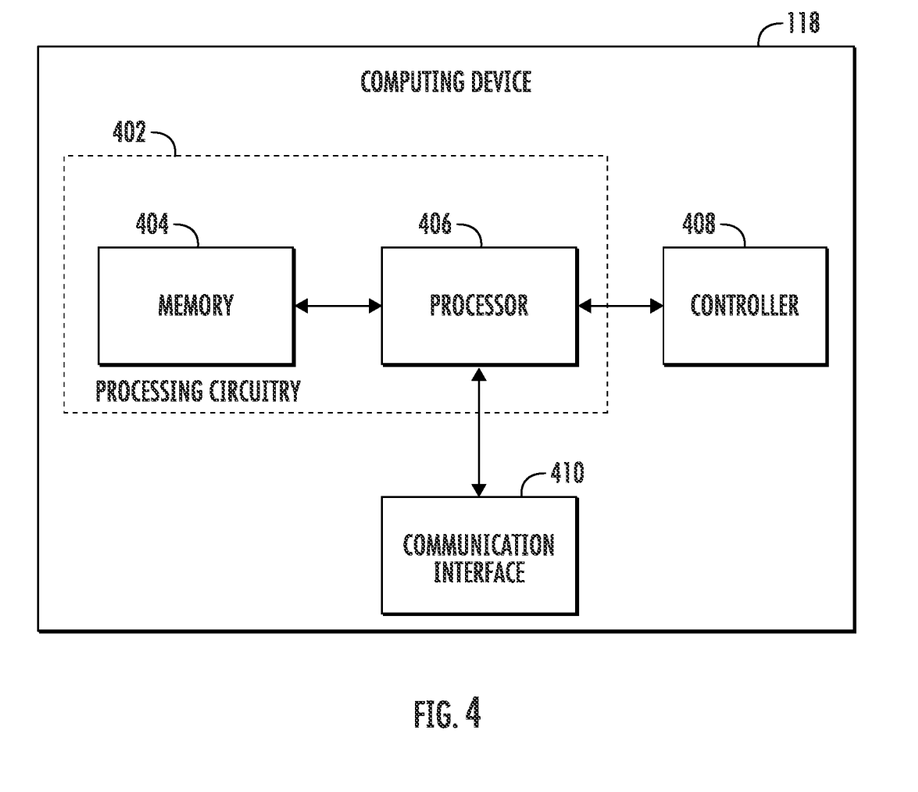
FIG. 4 illustrates a block diagram of an example computing device in accordance with one or more embodiments of the present disclosure.

With reference to FIG. 4, a block diagram of the computing device 118 is illustrated in accordance with some example embodiments. However, it should be noted that the components, devices or elements illustrated in and described with respect to FIG. 4 below may not be mandatory and thus one or more may be omitted in certain embodiments. Additionally, some embodiments may include further or different components, devices or elements beyond those illustrated in and described with respect to FIG. 4.

The computing device 118 may include or otherwise be in communication with processing circuitry 402 that is configurable to perform actions in accordance with one or more example embodiments disclosed herein. In this regard, the processing circuitry 402 may be configured to perform and/or control performance of one or more functionalities of the computing device 118 in accordance with various example embodiments, and thus may provide means for performing functionalities of the computing device 118 in accordance with various example embodiments. The processing circuitry 402 may be configured to perform data processing, application execution and/or other processing and management services according to one or more example embodiments. In some embodiments, the computing device 118 or a portion(s) or component(s) thereof, such as the processing circuitry 402, may be embodied as or comprise a chip or chip set. In other words, the computing device 118 or the processing circuitry 402 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computing device 118 or the processing circuitry 402 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 402 may include a processor 406 and, in some embodiments, such as that illustrated in FIG. 4, may further include memory 404. The processing circuitry 402 may be in communication with or otherwise control a communication interface 410 and/or a controller 408. As such, the processing circuitry 402 may be embodied as a circuit chip (e.g., an integrated circuit chip) configured (e.g., with hardware, software or a combination of hardware and software) to perform operations described herein.

The processor 406 may be embodied in a number of different ways. For example, the processor 406 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 406 may comprise a plurality of processors. The plurality of processors may be in operative communication with each other and may be collectively configured to perform one or more functionalities of the computing device 118 as described herein. The plurality of processors may be embodied on a single computing device or distributed across a plurality of computing devices collectively configured to function as the computing device 118. In some example embodiments, the processor 406 may be configured to execute instructions stored in the memory 404 or otherwise accessible to the processor 406. As such, whether configured by hardware or by a combination of hardware and software, the processor 406 may represent an entity (e.g., physically embodied in circuitry—in the form of processing circuitry 402) capable of performing operations according to embodiments of the present invention while configured accordingly. Thus, for example, when the processor 406 is embodied as an ASIC, FPGA or the like, the processor 406 may be specifically configured hardware for conducting the operations described herein. Alternatively, as another example, when the processor 406 is embodied as an executor of software instructions, the instructions may specifically configure the processor 406 to perform one or more operations described herein.

In some example embodiments, the memory 404 may include one or more non-transitory memory devices such as, for example, volatile and/or non-volatile memory that may be either fixed or removable. In this regard, the memory 404 may comprise a non-transitory computer-readable storage medium. It will be appreciated that while the memory 404 is illustrated as a single memory, the memory 404 may comprise a plurality of memories. The plurality of memories may be embodied on a single computing device or may be distributed across a plurality of computing devices collectively configured to function as the computing device 118. The memory 404 may be configured to store information, data, applications, instructions and/or the like for enabling the computing device 118 to carry out various functions in accordance with one or more example embodiments. For example, the memory 404 may be configured to buffer input data for processing by the processor 406. Additionally or alternatively, the memory 404 may be configured to store instructions for execution by the processor 406. As yet another alternative, the memory 404 may include one or more databases that may store a variety of files, contents or data sets. Among the contents of the memory 404, applications may be stored for execution by the processor 406 in order to carry out the functionality associated with each respective application. In some cases, the memory 404 may be in communication with one or more of the processor 406, communication interface 410, or the controller 408 via a bus(es) for passing information among components of the computing device 118.

In some example embodiments, the computing device 118 may further include a communication interface 410. In some cases, the communication interface 410 may be any means such as a device or circuitry embodied in either hardware, or a combination of hardware and software that is configured to receive and/or transmit data from/to a network and/or any other device or circuitry in communication with the processing circuitry 402. By way of example, the communication interface 410 may be configured to enable the computing device 118 to communicate with the light source 108, the photo diode 116, and/or other computing devices separate from the system 100. The communication interface 410 may, for example, include an analog to digital converter (ADC), digital to analog converter (DAC), antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the computing device 118 may include or otherwise control a controller 408. As such, the controller 408 may be embodied as various means, such as circuitry, hardware, a computer program product comprising computer readable program instructions stored on a computer readable medium (for example, the memory 404) and executed by a processing device (for example, the processor 406), or some combination thereof. The controller 408 may be capable of communication with one or more of the memory 404 or communication interface 410 to access, receive, and/or send data as may be needed to perform one or more of the functionalities of the controller 408 as described herein.

Many modifications and other embodiments of the embodiments set forth herein will come to mind to one skilled in the art to which these embodiments pertain having the benefit of teachings presented in the foregoing descriptions and the associated drawings. Although the figures only show certain components of the apparatus and systems described herein, it is understood that various other components may be used in conjunction with the system. Therefore, it is to be understood that the embodiments are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

That which is claimed:

1. A method for distinguishing an interfering gas in a gas flow, the method comprising:
    causing at least three wavelengths of light to be emitted from a light source;
    detecting a reflected portion of each of the at least three wavelengths of light, wherein the reflected portion of each of the at least three wavelengths of light is reflected from a treated tape that is in contact with the gas flow;
    distinguishing the interfering gas in the gas flow using a 2-dimensional color space model; and
    identifying the interfering gas as being a first known interfering gas of a plurality of known interfering gases based on a first distance from a location of the interfering gas within the 2-dimensional color space model being less than a distance from a location of the interfering gas within the 2-dimensional color space model to a known location of each of the other interfering gases in the plurality of known interfering gases within the 2-dimensional color space model.

2. The method of claim 1, further comprising:
    calculating, for each of the at least three wavelengths of light emitted from the light source, an adjusted count (AC) by:

$$AC = C\frac{N(0) - N(1)}{N(1)},$$

wherein N(0) represents a count for each of the at least three wavelengths of light at time zero, N(1) represents a count for each of the at least three wavelengths of light at time t, and C is a constant.

3. The method of claim 2, wherein the at least three wavelengths of light include a red wavelength, a green wavelength, and a blue wavelength.

4. The method of claim 3, further comprising:
    calculating a ratio of a blue wavelength AC to a green wavelength AC and a ratio of a red wavelength AC to the green wavelength AC.

5. The method of claim 4, further comprising:
    determining, using the ratio of the blue wavelength AC to the green wavelength AC and the ratio of the red wavelength AC to the green wavelength AC, the location of the interfering gas within the 2-dimensional color space model.

6. The method of claim 5, further comprising:
    calculating a distance ($d_i$) from the location of the interfering gas within the 2-dimensional color space model to the known location of each of the plurality of known interfering gases within the 2-dimensional color space model, wherein the distance from the location of the interfering gas to the known location of each of the plurality of known interfering gases is calculated by:

$$d_i = \sqrt{\Delta B2G_i^2 + \Delta R2G_i^2},$$

wherein $\Delta B2G_i$ represents the difference between the ratio of the blue wavelength AC to the green wavelength AC of the interfering gas and the ratio of the blue wavelength AC to the green wavelength AC of one of the known interfering gases and $\Delta R2G_i$ represents the difference between the ratio of the red wavelength AC to the green wavelength AC of the interfering gas and the ratio of the red wavelength AC to the green wavelength AC of one of the known interfering gases.

7. The method of claim 1, further comprising:
    determining a probability of the interfering gas being the first known interfering gas of the plurality of known interfering gases.

8. The method of claim 1, wherein each of the at least three wavelengths of light are emitted as separate light pulses.

9. The method of claim 1, wherein the interfering gas may be one of arsine, phosphine, germane, diborane, silane, or hydrogen sulfide.

10. A system for distinguishing an interfering gas in a gas flow, the system comprising:
    a treated tape configured to be in contact with the gas flow;
    a light source configured to emit at least three wavelengths of light;
    a photo diode configured to detect a reflected portion of each of the at least three wavelengths of light, wherein the reflected portion of each of the at least three wavelengths of light is reflected from the treated tape; and
    a computing device comprising at least one processor and at least one non-transitory memory comprising program code, wherein the at least one non-transitory memory and the program code are configured to, with the at least one processor, cause the computing device to:
    analyze the reflected portion of each of the at least three wavelengths of light;
    distinguish the interfering gas in the gas flow using a 2-dimensional color space model; and
    identify the interfering gas as being a first known interfering gas of a plurality of known interfering gases based on a first distance from a location of the interfering gas within the 2-dimensional color space model being less than a distance from a location of the interfering gas within the 2-dimensional color space model to a known location of each of the other interfering gases in the plurality of known interfering gases within the 2-dimensional color space model.

11. The system of claim 10, wherein the computing device is further caused to:
    calculate, for each of the at least three wavelengths of light emitted from the light source, an adjusted count (AC) by:

$$AC = C\frac{N(0) - N(1)}{N(1)},$$

wherein N(0) represents a count for each of the at least three wavelengths of light at time zero, N(1) represents a count for each of the at least three wavelengths of light at time t, and C is a constant.

12. The system of claim 11, wherein the at least three wavelengths of light include a red wavelength, a green wavelength, and a blue wavelength.

13. The system of claim 12, wherein the computing device is further caused to:
calculate a ratio of a blue wavelength AC to a green wavelength AC and a ratio of a red wavelength AC to the green wavelength AC.

14. The system of claim 13, wherein the computing device is further caused to:
determine, using the ratio of the blue wavelength AC to the green wavelength AC and the ratio of the red wavelength AC to the green wavelength AC, the location of the interfering gas within the 2-dimensional color space model.

15. The system of claim 14, wherein the computing device is further caused to:
calculate a distance ($d_i$) from the location of the interfering gas within the 2-dimensional color space model to the known location of each of the plurality of known interfering gases within the 2-dimensional color space model, wherein the distance from the location of the interfering gas to the known location of each of the plurality of known interfering gases is calculated by:

$$d_i = \sqrt{\Delta B2G_i^2 + \Delta R2G_i^2},$$

wherein $\Delta B2G_i$ represents the difference between the ratio of the blue wavelength AC to the green wavelength AC of the interfering gas and the ratio of the blue wavelength AC to the green wavelength AC of one of the known interfering gases and $\Delta R2G_i$ represents the difference between the ratio of the red wavelength AC to the green wavelength AC of the interfering gas and the ratio of the red wavelength AC to the green wavelength AC of one of the known interfering gases.

16. The system of claim 15, wherein the computing device is further caused to:
determine a probability of the interfering gas being the first known interfering gas of the plurality of known interfering gases.

17. The system of claim 10, wherein each of the at least three wavelengths of light are emitted as separate light pulses.

18. The system of claim 10, wherein the interfering gas may be one of arsine, phosphine, germane, diborane, silane, or hydrogen sulfide.

* * * * *